US008739178B2

(12) United States Patent
Bosold et al.

(10) Patent No.: US 8,739,178 B2
(45) Date of Patent: May 27, 2014

(54) METHOD OF CONFIGURING INTELLIGENT ELECTRONIC DEVICES TO FACILITATE STANDARDIZED COMMUNICATION MESSAGES AMONG A PLURALITY OF IEDS WITHIN A NETWORK

(75) Inventors: Mark J. Bosold, Pullman, WA (US); Thomas L. Ristine, Moscow, ID (US); Benjamin S. Day, Pullman, WA (US); David M. Nieuwsma, Moscow, ID (US); Ronald L. Baiar, Pullman, WA (US); Jason A. Dearien, Moscow, ID (US); Timothy P. Tibbals, Moscow, ID (US); Edward L. Evans, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 1136 days.

(21) Appl. No.: 11/781,468

(22) Filed: Jul. 23, 2007

(65) Prior Publication Data

US 2008/0127210 A1 May 29, 2008

Related U.S. Application Data

(60) Provisional application No. 60/820,035, filed on Jul. 21, 2006.

(51) Int. Cl.
*G06F 3/00* (2006.01)
*G06F 17/10* (2006.01)

(52) U.S. Cl.
USPC ............................ 719/313; 719/318; 700/286

(58) Field of Classification Search
CPC ....... H04L 29/06; H04L 67/16; H04L 67/306; H04L 67/303; H04L 67/34; H04L 12/2697; H04L 29/0627; H04L 41/0803; G06F 21/35; G06F 21/6218; G06F 21/6272; G06F 221/2117
See application file for complete search history.

(56) References Cited

U.S. PATENT DOCUMENTS 5,654,967 A    8/1997   Okuyama
5,872,722 A    2/1999   Oravetz
(Continued)

FOREIGN PATENT DOCUMENTS

WO    WO 99/00951    1/1999
WO    WO 00/11840    3/2000
(Continued)

OTHER PUBLICATIONS

Brunello, An Application of a Protective Relaying Scheme using the UCA/MMS Standard, Mar. 2002, pp. 1-8.*

(Continued)

*Primary Examiner* — Tuan Dao
(74) *Attorney, Agent, or Firm* — Panasarn Aim Jirut; Richard M. Edge (57) ABSTRACT

Provided is a system and method of configuring IEDs to facilitate standardized communication messages among a plurality of IEDs within a power system network based on the IEC 61850 standard. A description file is described for an intelligent electronic device configured in accordance with the IEC-61850 standard. The description file includes a section which indicates which GOOSE message the intelligent electronic device should receive. In yet another embodiment, the description file includes a section which is capable of linking to logic functions of the intelligent electronic device for performing programmable data binding or dynamic data binding. A configuration tool is further provided for editing and creating such description files. A method for selectively receiving messages from an intelligent electronic device configured in accordance with the IEC-61850 standard is also described herein, along with a method for optimizing file space and improving execution speed of an intelligent electronic device configured in accordance with the IEC-61850 standard.

15 Claims, 9 Drawing Sheets

(56) References Cited

U.S. PATENT DOCUMENTS

| | | | |
|---|---|---|---|
| 5,978,784 A | 11/1999 | Fagg | |
| 5,987,393 A | 11/1999 | Stinson | |
| 6,377,283 B1 | 4/2002 | Thomas | |
| 6,426,951 B1 | 7/2002 | Antonsson | |
| 6,496,862 B1 | 12/2002 | Akatsu | |
| 6,618,455 B1 | 9/2003 | Maeda | |
| 6,753,772 B2 | 6/2004 | Winkler | |
| 6,795,789 B2 | 9/2004 | Vandiver | |
| 6,970,771 B1 * | 11/2005 | Preiss et al. | 700/286 |
| 6,973,589 B2 | 12/2005 | Wright | |
| 7,552,446 B1 * | 6/2009 | Sosnovsky et al. | 719/318 |
| 2002/0054096 A1 | 5/2002 | Thomas | |
| 2002/0144038 A1 * | 10/2002 | Smith | 710/240 |
| 2002/0173927 A1 * | 11/2002 | Vandiver | 702/122 |
| 2004/0044991 A1 | 3/2004 | Eschermann | |
| 2004/0138787 A1 * | 7/2004 | Ransom et al. | 700/295 |
| 2004/0240470 A1 | 12/2004 | Medved | |
| 2005/0058149 A1 | 3/2005 | Howe | |
| 2005/0097373 A1 | 5/2005 | Stoupis | |
| 2006/0085103 A1 * | 4/2006 | Smith et al. | 701/19 |
| 2006/0095716 A1 | 5/2006 | Ramesh | |
| 2006/0116794 A1 * | 6/2006 | Stoupis et al. | 700/286 |
| 2006/0230394 A1 * | 10/2006 | Forth et al. | 717/168 |
| 2007/0033590 A1 * | 2/2007 | Masuouka et al. | 718/100 |

FOREIGN PATENT DOCUMENTS

| | | | |
|---|---|---|---|
| WO | WO 01/88664 A2 | 11/2001 | |
| WO | WO 2006/017944 A1 | 2/2006 | |

OTHER PUBLICATIONS

UCA and 61850 for Dummies, Douglas Proudfoot, Mar. 21, 2002, pp. 1-37.*

"Overview of IEC 61850 and Benefits", Mackiewicz, 2006, pp. 1-8.*

Technical Report—IEC TR 61850-1—International Electrotechnical Commission 2003.

Ethernet & IEC 61850: Start Up Manual—Siemens—Dec. 5, 2005.

IEEE Standard for Synchrophasors for Power Systems—IEEE Std C37.118-2005.

Control and Automation of Power System Substation using IEC61850 Communication; T.S. Sidhu, Fellow, IEEE, Pradeep K Gangadharan, Student Member, IEEE; Proceedings of the 2005 IEEE Conference on Control Applications, Toronto, Canada, Aug. 28-31, 2005.

Practical Considerations in Application of UCA GOSSE; Mark Adamiak, Drew Baigent, GE Power Management, King of Prussia, PA, Markham, Ontario; Scott Evans, GE Corporate Research and Development, Schenectady, NY; Presented at: Georgia Tech Relay, May 3-5, 2000.

PCT/US2007/074078 Written Opinion of the International Searching Authority, Sep. 16, 2008.

PCT/US2007/074078 International Search Report of the International Searching Authority, Sep. 16, 2008.

* cited by examiner

METHOD OF CONFIGURING INTELLIGENT ELECTRONIC DEVICES TO FACILITATE STANDARDIZED COMMUNICATION MESSAGES AMONG A PLURALITY OF IEDS WITHIN A NETWORK

RELATED APPLICATION

This application claims benefit under 35 U.S.C. §119(e) of U.S. Provisional Application Ser. No. 60/820,035, entitled "A Method of Configuring Intelligent Electronic Devices to Facilitate Standardized Communication Messages Among a Plurality of IEDs Within a Network," filed Jul. 21, 2006 naming Mark J. Bosold, David M. Nieuwsma, Ronald L. Baiar, Edward L. Evans, Benjamin S. Day, Thomas L. Ristine, Jason A. Dearien and Timothy P. Tibbals as inventors, the complete disclosure thereof being incorporated by reference.

BACKGROUND OF THE INVENTION

The present invention generally relates to a system and method of configuring intelligent electronic devices (IEDs) within a network, and more specifically, to a system and method of configuring IEDs to facilitate standardized communication messages among a plurality of IEDs within a power system network.

Power systems generally include a plurality of intelligent electronic devices (IEDs) which perform various functions including, but not limited to, protection, monitoring, control, and automation of an associated portion of the power system. For example, IEDs may be associated with supervisory control and data acquisition (SCADA) systems, energy management systems (EMS), distribution management systems (DMS), distribution automation (DA) systems, and teleprotection systems for power systems to name a few. Each IED generally performs different functions and is typically manufactured by different companies. Likewise, the communication protocols, messaging structures and messaging sequences used often varies from IED to IED.

Because there was a desire to more easily network these IEDs together and, in essence, merge the varying communication capabilities of these different IEDs, the International Electrotechnical Commission (IEC) instituted a standard for Communication Networks and Systems in Substations. This standard is commonly known as and is defined in the IEC 61850, the complete disclosure being incorporated by reference herein and made a part hereof. Although it is described to be applicable to substation automation systems (SAS), IEC 61850 may be applied across any portion or the entire power system. In addition to being a communication standard, IEC 61850 further covers qualitative properties of engineering-tools, measures for quality management, and configuration management.

Part 6 of the IEC 61850 standard defines a specific configuration language which allows users to exchange device descriptions and system parameters among different IEDs. This language is referred to as a Substation Configuration Language (SCL) and is based on eXtensible Markup Language (XML). An IED is considered to be compatible with IEC 61850 if it a) is accompanied either by an SCL file describing its capabilities, or by a tool, which can generate this file from the IED, and b) can directly use a system SCL file to set its communication configuration, as far as a setting is possible in the IED, or it is accompanied by a tool which can import a system SCL file to set these parameters to the IED.

IEC 61850 defines four types of SCL files—IED Capability Description (ICD) files, System Specification Description (SSD) files, Substation Configuration Description (SCD) files, and Configured IED Description (CID) files. ICD files describe the capabilities of an IED. ICD files generally comprise an IED section, data type templates, logical node type definitions, an optional communication section and an optional substation section which denotes the physical entities corresponding to the IED. SSD files describe the specification of the related system (e.g., a single line diagram of the substation and the required logical nodes). SSD files generally comprise a substation description section, data type templates, and logical node type definitions. SCD files describe the complete substation or power system detail. SCD files generally comprise a description section for each IED, a communication configuration section and a substation description section. CID files are used to communicate data or settings between an IED and a configuration tool of an IED. CID files generally include a communication section which contains the current address of the IED.

Using a software configuration tool, a CID file for an IED is typically generated from an ICD file that describes the IED along with the respective CID files from other IEDs of the same or different manufacturers and/or from an SCD file. The CID file and other IED settings are transferred or programmed into the IED for field service.

IEC 61850 further provides both high-speed communication for protection/control functions and medium speed communication (e.g., through messaging) for monitoring power system quantities and status over a network such as, for example, Ethernet local area networks (LANs) and wide area networks (WANs). For example, IEC 61850 defines a Generic Object-Oriented Substation Event (GOOSE) protocol which is a high-speed messaging protocol useful for communicating protection/control functions and status between IEDs. GOOSE messages transmitted by a specific IED are defined within its CID file as a data set composed of several functionally constrained data attributes (FCDA). Each FCDA describes a subset or sub-hierarchy of data within the full data hierarchy defined by the ICD or CID of the IED.

The following XML code is an example of the basic structure and elements of an SCL for an IED with the name 487B_1, the type 487B, and the manufacturer SEL. The structure of these attributes and values is defined in the IEC 61850 standard.

```
<?xml version="1.0" encoding="utf-8"?>
<SCL xmlns="http://www.iec.ch/61850/2003/SCL">
<Communication>
</Communication>
<IED name="SEL_487B_1" type="SEL_487B" manufacturer="SEL" configVersion="ICD-487B-
R100-V0-Z001001-D20060512">
    <AccessPoint name="S1">
        <Server>
```

```
            <LDevice desc="Data sets and control blocks" inst="CFG">
                <LN0 InType="LN0" InClass="LLN0" inst="">
                    <DataSet name="Small_GOOSE_DataSet1">
                        <FCDA IdInst="ANN" prefix="CCOUT" InClass="GGIO" InInst="20"
                            doName="Ind01" daName="stVal" fc="ST" />
                        <FCDA IdInst="ANN" prefix="CCOUT" InClass="GGIO" InInst="20"
                            doName="Ind02" daName="stVal" fc="ST" />
                        <FCDA IdInst="ANN" prefix="CCOUT" InClass="GGIO" InInst="20"
                            doName="Ind03" daName="stVal" fc="ST" />
                    </DataSet>
                    ...
                    <GSEControl name="GooseTX" datSet="Small_GOOSE_DataSet1"
                            confRev="1" appID="SEL_487B_1">
                    </GSEControl>
                    ...
                </LN0>
                <LN InType="LPHD1" InClass="LPHD" inst="1" prefix="CFG">
                ...
                </LN>
            </LDevice>
            ...
        </Server>
    </AccessPoint>
</IED>
<DataTypeTemplates>
...
</DataTypeTemplates>
</SCL>
```

While IEC 61850 provides for a communications protocol which addresses previous interoperability between IEDs from different manufacturers, there are a number of areas that the standard either neglects, or dispenses with by deeming it a local issue to be resolved independently. For example, IEC 61850 fails to provide a method which allows a specific IED to describe within its CID file which GOOSE messages of other IEDs within the system that it should receive. Accordingly, it is an object of the present invention to provide a method which provides a CID file that specifies which GOOSE message a particular IED should receive.

IEC 61850 further fails to provide a method for modifying the capabilities beyond those described with the ICD file originally provided by the manufacturer. Accordingly, it is an object of the present invention to provide a method for modifying such capabilities without upgrading the firmware or internal software of the IED.

These and other desired benefits of the preferred embodiments, including combinations of features thereof of the invention will become apparent from the following description. It will be understood, however, that a process or arrangement could still appropriate the claimed invention without accomplishing each and every one of these desired benefits, including those gleaned from the following description. The appended claims, not these desired benefits, define the subject matter of the invention. Any and all benefits are derived from the multiple embodiments of the invention, not necessarily the invention in general.

SUMMARY OF THE INVENTION

According to an aspect of the invention, disclosed is a description file for an intelligent electronic device configured in accordance with the IEC-61850 standard for GOOSE messaging with other intelligent electronic devices. The description file includes a section which indicates which GOOSE message the intelligent electronic device should receive.

In accordance with another aspect of the invention, a configuration tool is provided for creating description files in accordance with the IEC-61850 standard for GOOSE messaging with other intelligent electronic devices. The configuration tool includes an editing tool adapted to edit the description file to create a section therein which indicates which GOOSE message the intelligent electronic device should receive.

In accordance with another aspect of the invention, provided is a description file for an intelligent electronic device configured in accordance with the IEC-61850 standard for messaging with other intelligent electronic devices. The description file includes a section capable of linking to logic functions of the intelligent electronic device for performing programmable data binding or dynamic data binding.

In accordance with another aspect of the invention, a configuration tool is provided for creating description files in accordance with the IEC-61850 standard for GOOSE messaging with other intelligent electronic devices. The configuration tool includes an editing tool adapted to edit the description file to create a section therein which is capable of linking to logic functions of the intelligent electronic device for performing programmable data binding or dynamic data binding.

In accordance with yet another aspect of the present invention, provided is a method for selectively receiving messages from an intelligent electronic device configured in accordance with the IEC-61850 standard for messaging with other intelligent electronic device, wherein the message includes a number of bits. The method generally includes the steps of creating a message including at least one bit representative of the quality of the message, and selectively receiving the message by analyzing the bit representative of the quality of the message.

In accordance with yet another aspect of the present invention, provided is a method for optimizing file space and improving execution speed of an intelligent electronic device configured in accordance with the IEC-61850 standard for messaging with other intelligent electronic device, wherein the message includes a number of bits. The method generally includes the steps of creating a message including at least one bit indicating important data bits, and selectively receiving the message based on the bit indicating important data in order to prioritize the important data bits.

DETAILED DESCRIPTION OF THE MULTIPLE EMBODIMENTS OF THE PRESENT INVENTION

This invention relates to a method of configuring IEDs to facilitate standardized communication messages among a plurality of IEDs within a power system network.

Figure 1:
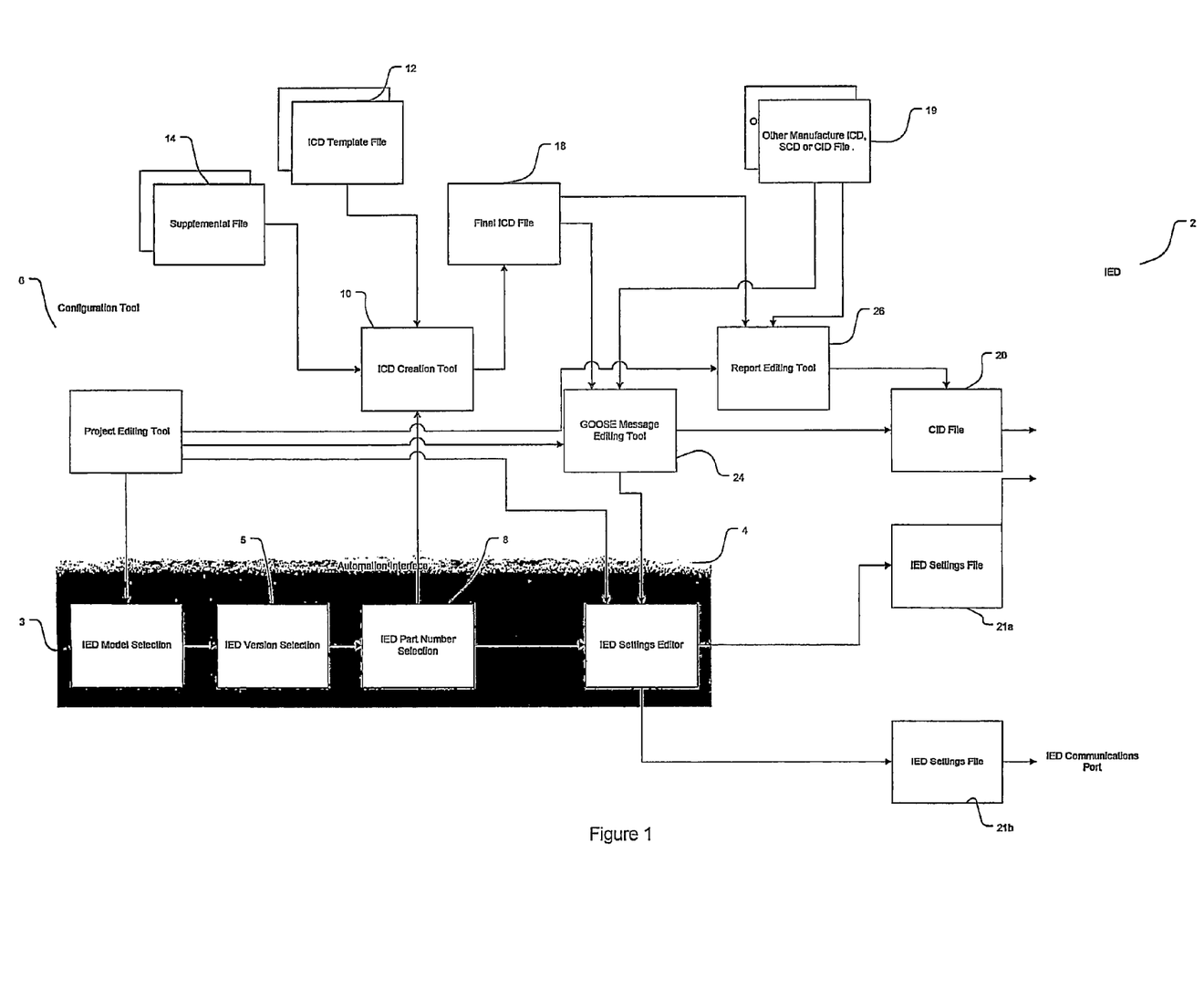
FIG. 1 is a block diagram of a system for creating an IEC 61850 SCL file according to an embodiment of the present invention.

FIG. 1 illustrates a block diagram of a system for creating IEC 61850 SCL files according to an embodiment of the present invention. An IED 2 is provided which is in communication with an automation interface 4 and an IEC 61850 configuration tool 6. An IEC 61850 configuration tool 6 may be provided to create appropriate ICD and CID files. The configuration tool 6 may be operated by a piece of software such as Architect™ software available from Schweitzer Engineering Laboratories, Inc. (Pullman, Wash.).

An ICD file generally includes various sections of information such as IED information, communications information, header information, and the like. In order to create an ICD file, a user selects an IED model 3, version (e.g., firmware revision) 5, and/or part number 8 using automation interface 4. The IED model 3, version 5, and/or part number 8 are provided to the ICD creation tool 10 of the configuration tool 6 to create a final ICD file 18.

Alternatively, certain data may be common to the ICD files for several of the IEDs. Accordingly, it may be undesirable to duplicate these common items because of an increase of file size, which may result in longer transfer times. Accordingly, the configuration tool 6 may be adapted to utilize templates which include the common items from the ICD files.

In such an embodiment, an ICD template file 12 along with a supplemental file 14 may also be provided to the ICD creation tool 10 of the configuration tool 6 for creation of a final ICD file 18. The ICD template file 12 provides a structure and basic ICD information. The supplemental file 14 contains supplemental data or modifications to the ICD template files based on certain characteristics of the selected IED (e.g., model, version, or part number rules for IEC 61850 logical devices and Node Mapping). The ICD template file 12 and supplemental file 14 are provided to an ICD creation tool 10 of the configuration tool 6 to provide a final ICD file 18.

It is to be noted that the supplemental file 14 is optional. Accordingly, the ICD template file 12 may provide all necessary data for the creation of a final ICD file 18, thereby requiring no supplemental data. In another embodiment, the configuration tool 6 may include a database of ICD files from which ICD files for the various ICDs on the network may be selected. In yet another embodiment, ICD files may be transmitted to the configuration tool 6 from a database separate and apart from (e.g., outside of) the configuration tool 6. Alternatively, these ICD files may originate from another manufacturer as shown at 19.

Figure 2A:
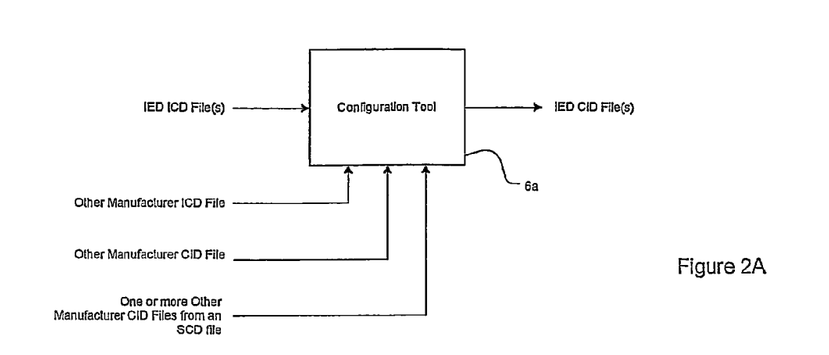
FIGS. 2A and 2B are respectively block diagrams of systems for creating a CID file according to certain embodiments of the present invention.
Figure 2B:
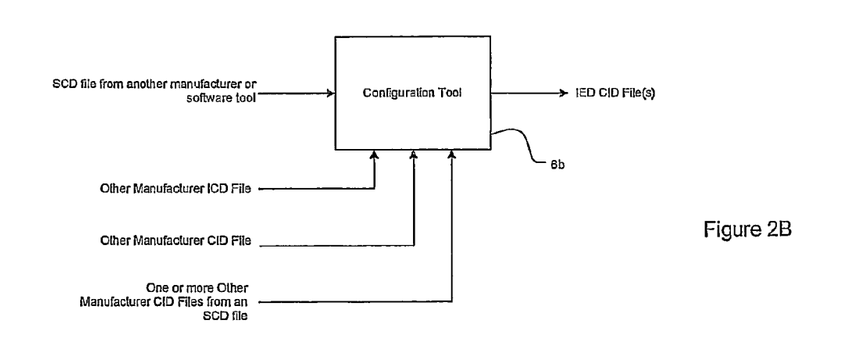

The final ICD file 18 may be used to create a CID file 20. As shown more specifically in FIGS. 2A-2B. It is also to be noted that other ICD or CID files for other IEDs on the network may be introduced into the configuration tool 6 in order to create CID files. FIGS. 2A and 2B illustrate block diagrams wherein a configuration tool (such as that shown in at 6 in FIG. 1) is used to create an IED CID file. In one embodiment illustrated by FIG. 2A, the configuration tool 6a creates the CID file using the IED ICD file along with other manufacturer ICD file(s), other manufacturer CID file(s) and/or other manufacturer CID file(s) from an SCD file. In another embodiment as illustrated by FIG. 2B, the configuration tool 6b creates the CID file using an SCD file from another manufacturer or a software tool, along with other manufacturer ICD file(s), other manufacturer CID file(s) and/or other manufacturer CID file(s) from an SCD file as shown at 19.

In each of the embodiments as shown in FIGS. 1, 2A, 2B, and 3, the CID file may be transferred to the respective IED, thus allowing the IED to operate within a network with other IEC 61850 compliant IEDs. Other IED settings 21a, 21b may also be uploaded to the IED.

Figure 3:
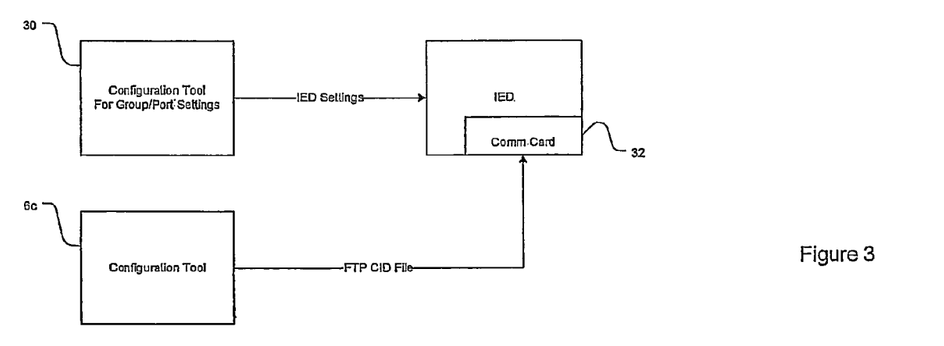
FIG. 3 is a block diagram of a system for creating and transferring IED settings data and CID files according to an embodiment of the present invention.

For example, as illustrated in FIG. 3, a configuration tool 6c may be used in parallel with a separate configuration tool 30. Configuration tool 30 may be used for configuring IED port or group settings. Configuration tool 8c may be used to create a CID file which may be uploaded to a communications card 32 of the IED using configuration tool 6c through a file transfer method such as File Transfer Protocol (FTP). A user name and a password may also be implemented to provide secured access to the IED to transfer the CID file. In another embodiment, the password may be encrypted for security. Alternatively, the configuration tool may require a final confirmation from the user through a HMI feature before the CID file is exported to the IED. This final confirmation step permits the user to intervene and perform a final review, or otherwise make further edits or last minute modifications to the CID file before exporting the file.

In an embodiment, the circuitry of the configuration tool 6 may include a processor, a memory location, and a graphical user interface. The processor may be adapted to operate a configuration application for generating a configured IED file (e.g., an IEC 61850 SCL file) which facilitates standardized communication messages to the respective plurality of IEDs within a network or within a project. The memory location may be used for storing a repository of IED standard files. In an embodiment, the repository of IED standard files may include among other things such as ICD, CID, SSD, SCD files, and/or other IED settings files. The repository of IED standard files may further be previously stored in the memory or may alternatively be imported from common logical or physical storage mediums or through the network.

In yet another embodiment, the IED repository of standard files may include template files. The template files may include default values which are stored and capable of being edited. In another embodiment, the IED repository of standard files may include information such as manufacturer, model number, version number with modifications, part number, or rules for IEC 61850 logical devices and nodes and mapping file.

As discussed above, the configuration tool may include a graphical user interface (GUI) which may depict information such as IED configurations, GUI and human machine interface (HMI) displays of a tree diagram on configurations showing hierarchical layers and mapped data structure, IED settings, reporting, graphical display and indication on CID file size and capacity, etc. The GUI may further include a section depicting the incoming GOOSE message and another section depicting a control input and control data item. The icons representing the data sets or child elements of items within the datasets of the incoming GOOSE message may be "dragged and dropped" to the appropriate control inputs.

Figure 5:
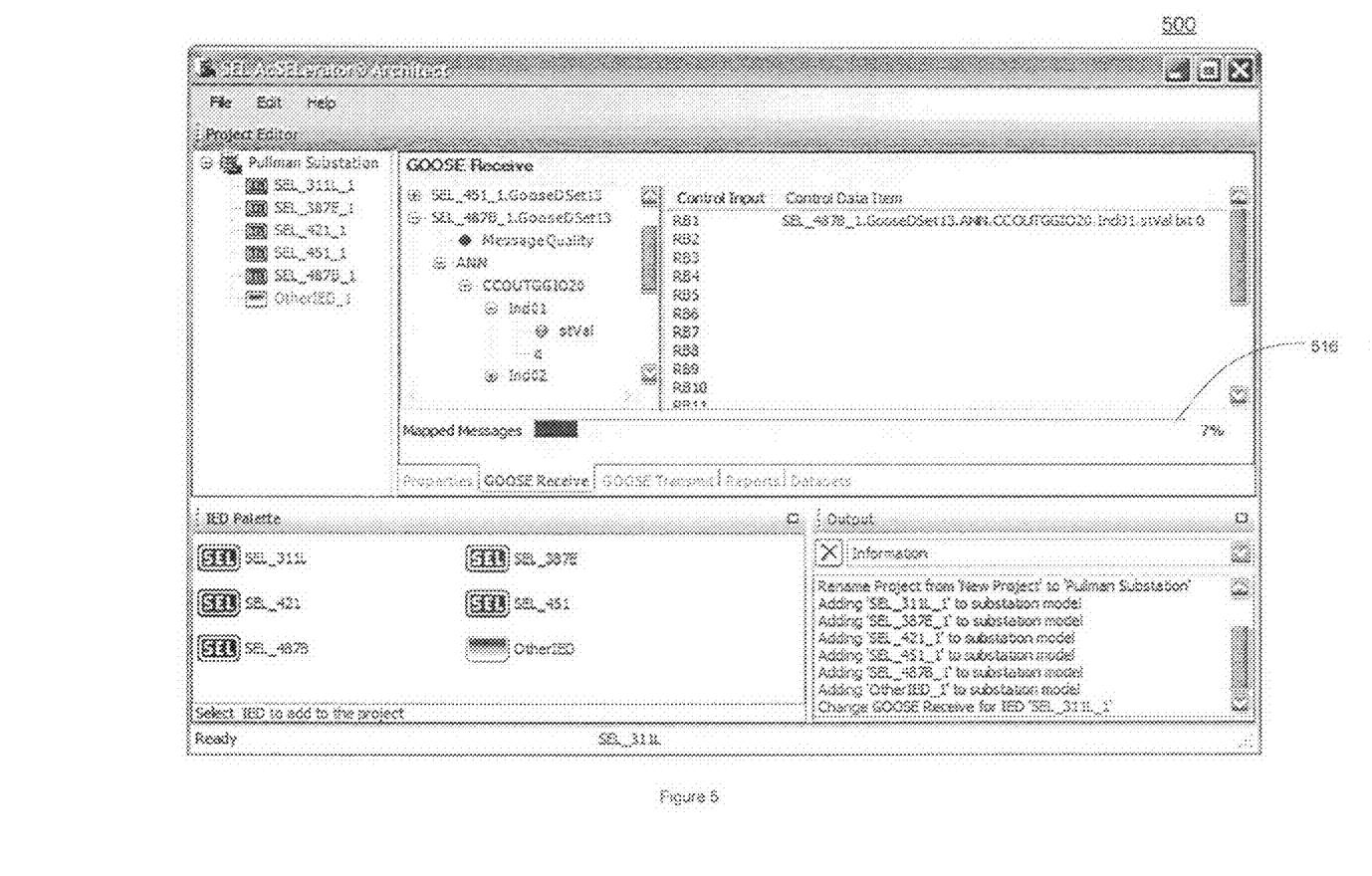

An example of a GUI 500 is illustrated in FIG. 5, which depicts the mapping of a message from an "SEL 487B" IED to an "SEL 311L" IED. The window titled "GOOSE Receive" shows a left-hand portion which includes an expandable tree with the information of the SEL 487B IED information, and a right-hand portion showing the internal control inputs of the SEL 311L IED. The item titled "stVal" in the 487B IED message has been dragged and dropped into the Control Data Item of Control Input RB1 of the SEL 311L IED. Further included is a graphic representing the proportion of the SEL 311L IED message that has been mapped to the SEL 487B IED after the title "Mapped Message" 516 showing, for example, the proportion of the available space for an IED message that has been filled. The tool thus maps the stVal item from the 487B IED to the Control Input RB1 of the SEL 311L IED. The tool configures the CID file for the 311L to indicate this mapping.

Figure 4:
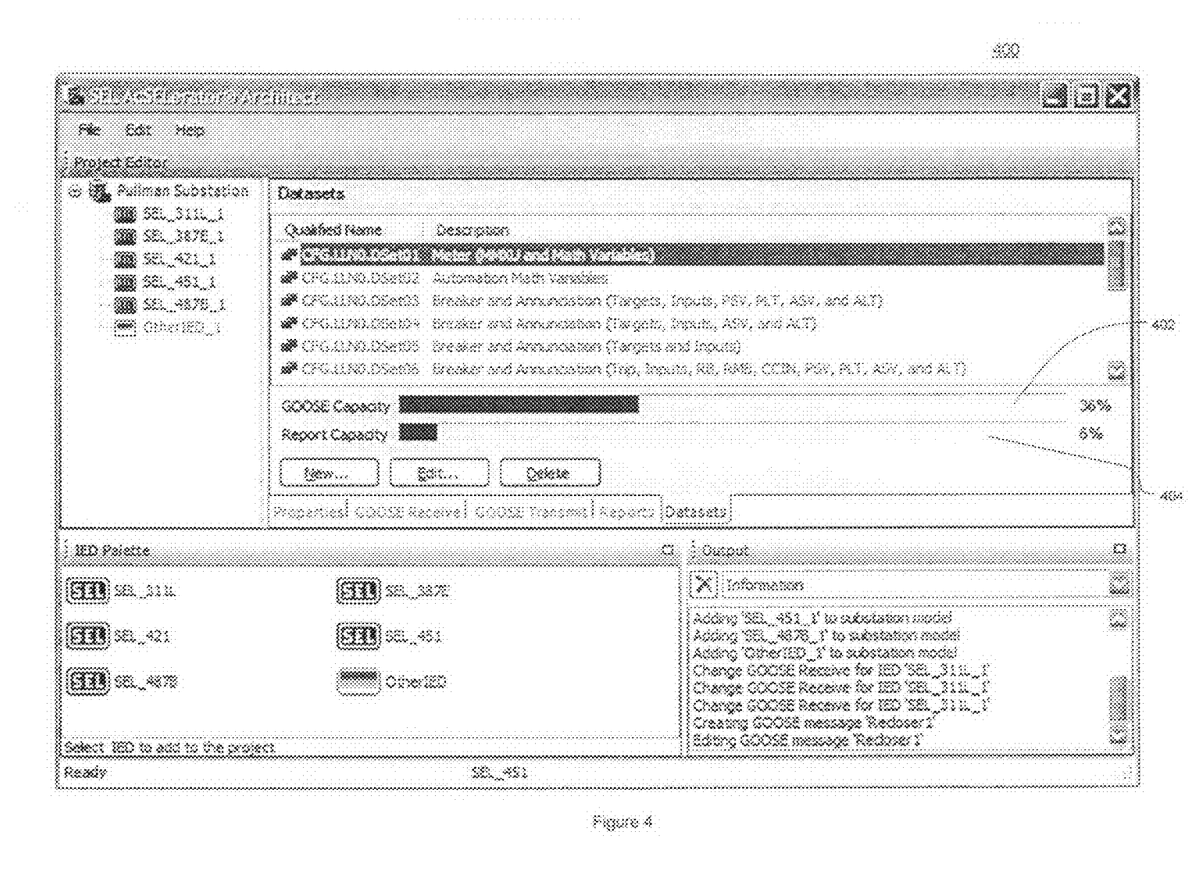
FIG. 4-8,10 are screenshots of graphical user interfaces according to various embodiments of the present invention.
Figure 6:
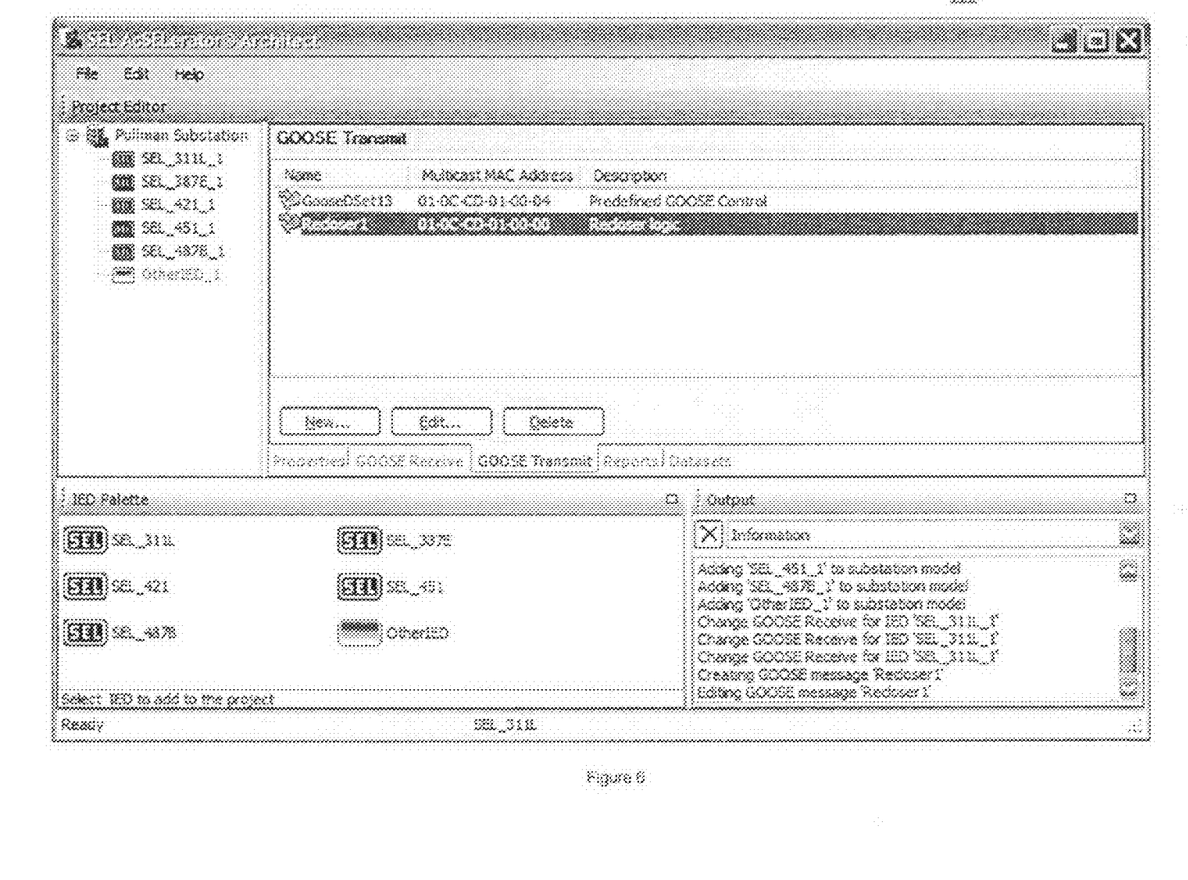
Figure 7:
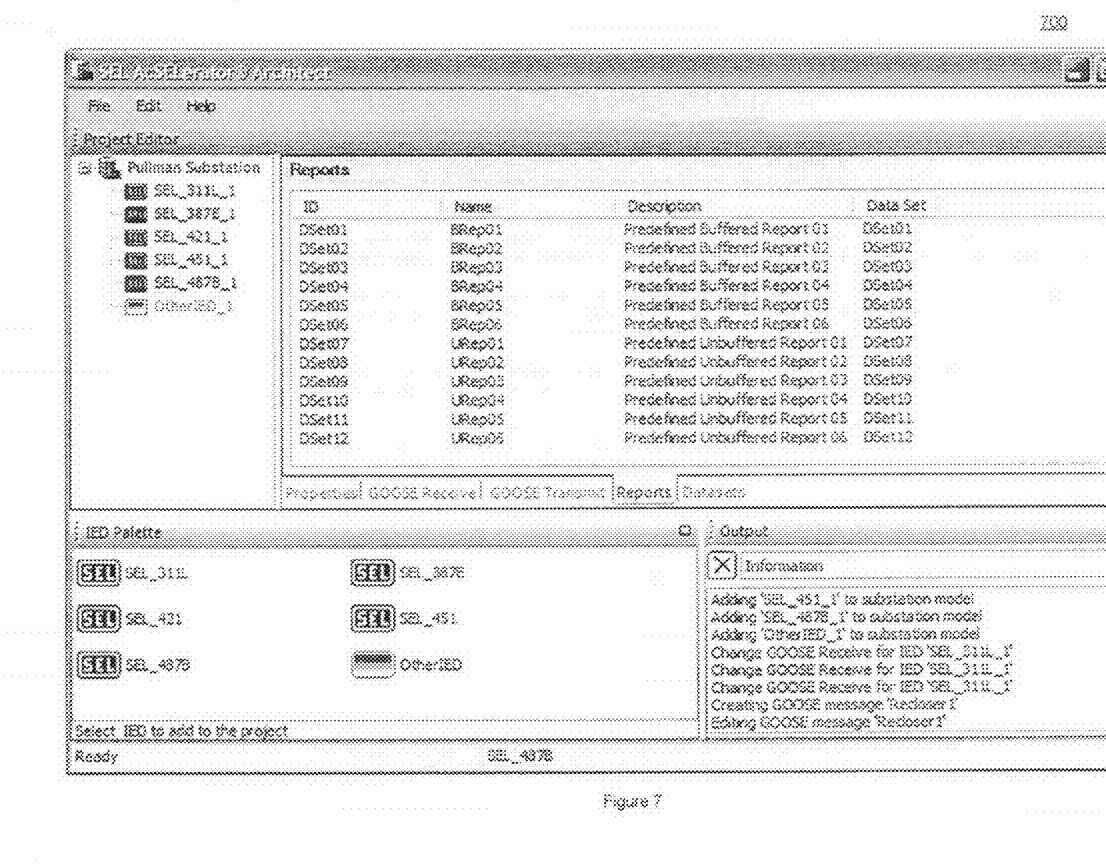
Figure 8:
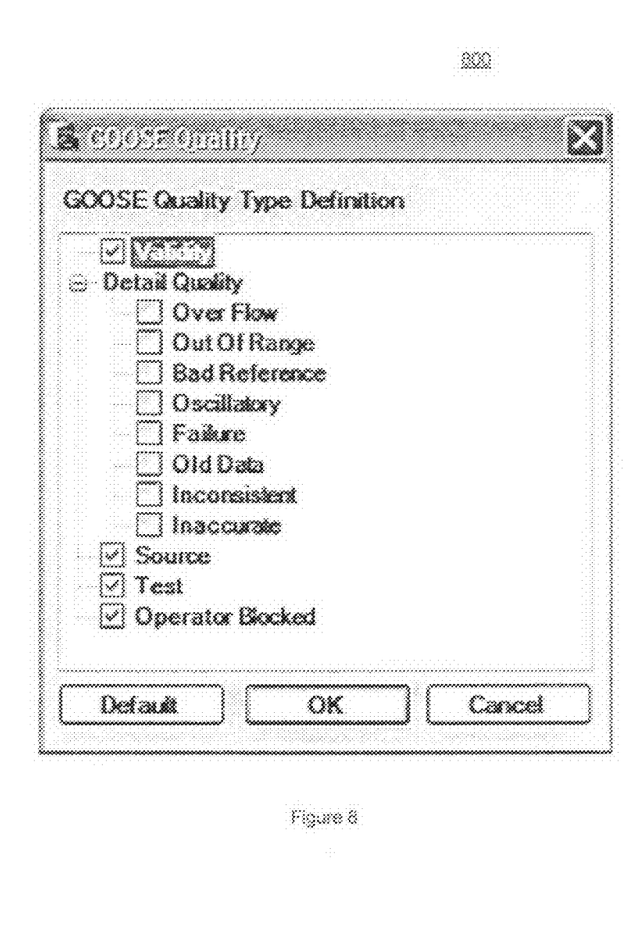

Other examples of a graphical user interface are illustrated in FIGS. 4, 6, 7, and 8. FIG. 4 illustrates a graphical user interface 400 of such a tool where a GOOSE message 402 or a report 404 is being configured, and a bar illustrates how much available resource (such as disk space, bandwidth, or the like) is left in the corresponding GOOSE message or report FIG. 6 illustrates a graphical user interface 600 of such a tool showing GOOSE transmit messages. FIG. 7 illustrates a graphical user interface 700 listing the reports available in a specific IED. FIG. 8 illustrates a graphical user interface 800 of such a tool showing the GOOSE quality type definition where certain attributes may be selected. Functions displayed using these different GUIs are discussed in further detail below.

Now referring back to FIG. 1, the configuration tool may optionally include a Report Editing tool 26 which generates and edits reports. The Report Editing tool 26 may be adapted to keep track of assigned data attribute instances within a Logical Object under a Logical Node in a Logical Device under the configured IED thus forming a mapping structure to associate large amount of hierarchical information. Any new assignments may be checked against the mapping structure databases and issue a notification for any duplication of data attribute instances.

The configuration tool may further include a GOOSE Message Editing Tool 24 which generates a CID file with internal Data Binding information and Outgoing GOOSE message. IEC 61850 specifies how to describe an outgoing GOOSE message from an IED; however, the standard fails to specify which GOOSE message the IED should receive. In an embodiment of the invention, a section in the CID file is provided to indicate which GOOSE message the IED should receive. In an embodiment, the configuration tool defines optional non-standard IED capabilities as resources through adding XML information (via a section) anywhere within the CID file. Specifically, the GOOSE Message editing tool 24 may be used to add such XML information to the SCL within the file at the location that associates the Logical Node data attribute.

In yet another embodiment, the memory location of the configuration tool 6 may include a data model module that stores a repository of common functions, descriptions, headers, template files, data settings, and logical nodes of the IEDs in the network. The benefit of the data model module is to eliminate redundancy and duplication of information common to the IEDs in the network in the CID file for the configured IED. This has the advantage of allowing for a smaller CID file, where, if all functions were included, there is potential for a large CID file.

IEC 61850 also fails to define a method to associate and to map Logical Node data between a select IED and other respective IEDs in a CID file. In yet another embodiment of the present invention, data from received GOOSE messages may be associated with IED logical nodes and/or internal data by adding XML information within a CID file at the location that associates the Logical Node data attribute. This allows the IED to internally map the information (functions and capabilities) according to the data attribute (custom defined variable). In an embodiment, the optional IED resources may be identified as remote bits and number of GOOSE receive messages. The XML information allows binding of data that prevents alterations or deletions without permission.

In yet another embodiment, a method of internal data binding and object model is provided to map to an existing product data structure to comply with IEC 61850 standard. Below is an example which illustrates association or mapping between an internal object model or data representation and the object model of the IEC 61850 communications protocol. In this example, an ICD file may describe the capabilities of an IED. A Data Type Template section is provided in the ICD file to specify an LPHD Logical Node of type LPHD1. The following XML fragment from the ICD file shows an instantiation of a Logical Node named CFGLPHD1 using the LPHD1 template.

```
<LN InType="LPHD1" InClass="LPHD" inst="1" prefix="CFG">
    <DOI name="PhyNam">
        <DAI name="vendor">
            <Val>SEL</Val>
        </DAI>
        <DAI name="serNum">
            <Val>S/N=090565</Val>
        </DAI>
        <DAI name="model">
            <Val>SEL-487B</Val>
        </DAI>
    </DOI>
    <DOI name="PhyHealth">
        <DAI name="stVal">
            <Val>... </Val>
        </DAI>
        <DAI name="q">
            <Val>...</Val>
        </DAI>
    </DOI>
    <DOI name="Proxy">
        <DAI name="stVal">
            <Val>...</Val>
        </DAI>
        <DAI name="q">
            <Val>...</Val>
        </DAI>
    </DOI>
</LN>
```

The following XML fragment illustrates how the previous fragment can be modified to include information to express the association between internal representations and the IEC 61850 data attributes. As discussed above, the modification may be performed by using a tool (e.g., a GOOSE message editing tool 24 of FIG. 1). Alternatively, or in combination with use of a tool, the modification may be performed by line-by-line editing of the XML file. In one embodiment of the present invention, after the configuration tool has created the CID file, but before the CID file is uploaded to an IED, the user may be given the opportunity to open the CID file to view the XML, and perform line-by-line editing of the file. Once the user has performed any desired line-by-line editing, the CID file may be re-checked by an optional validator (not shown), and/or uploaded to the respective IED.

```
<LN InType="LPHD1" InClass="LPHD" inst="1" prefix="CFG">
    <DOI name="PhyNam">
        <DAI name="vendor" esel:datasrc="imm">
            <Val>SEL</Val>
        </DAI>
        <DAI name="serNum" esel:datasrc="internal reference string"/>
        <DAI name="model" esel:datasrc="internal reference string"/>
    </DOI>
    <DOI name="PhyHealth">
        <DAI name="stVal" esel:datasrc="internal reference string"/>
        <DAI name="q" esel:datasrc="internal reference string"/>
    </DOI>
    <DOI name="Proxy">
        <DAI name="stVal" esel:datasrc="internal reference string">
            <Val>0</Val>
        </DAI>
        <DAI name="q" esel:datasrc="internal reference string"/>
    </DOI>
</LN>
```

The esel:datasrc attribute value is stated above as "internal reference string". However, this "internal reference string" is any text that describes the association of the IEC 61850 Instantiated Data Attribute (DAI) and the internal object model or data representation of the IED, and can be interpreted by the IED for the purposes of creating or supporting that association.

In a variant to the aforementioned embodiment, the internal reference string may be used at any level of the object hierarchy of the IEC 61850 communications protocol's object model that is suited for association or mapping to the internal object model or data representation of the IED, and may be interpreted by the IED for the purposes of creating or supporting that association.

In yet another variant, the "internal reference string" may contain programmatic information which the IED may interpret for the purposes of deriving the data required by the external object model or data representation from the internal object model or data representation of the IED by means of definition, selection, calculation and/or composition.

It may also be advantageous for the IED to instantiate a collection of one or more internal objects corresponding to the Logical Nodes declared in an IED instantiation section of the ICD file, and their associations to the internal object model and/or data representation.

In another advantageous variant, the IED may use a common manufacturer design pattern to instantiate internal objects to represent new Logical Nodes that have not been defined by the manufacturer's ICD file distributed with the IED. In this embodiment, the "internal reference string" containing programmatic information may be used by the new internal objects and other subsystems within the IED capable of interpreting programmatic information for the purposes of definition, selection, calculation and/or composition of data attributes for the new internal object from the internal object model and/or data representation of the IED.

In yet another embodiment, a data definition language may be used to describe the GOOSE messages that will be received by the IED. In this embodiment, the GOOSE message descriptions are then placed within XML sections of the CID file for the IED. A data definition language such as the well known Abstract Syntax Notation number One (ASN.1) may further be used to permit naming of variables or data attributes.

In yet another embodiment of the present invention, a CID file may be adapted to link to the logic functions of the IED to perform programmable data binding or dynamic data binding. For example, the CID file may be adapted to call out data attributes that can be derived from the outputs of logic functions in the IED. This capability may be called out within the file description. Accordingly, there is no need to modify the firmware of the IED to perform the functions.

In an example, a CID file is modified by adding a new Logical Node that represents an auto recloser to a relay. More specifically, a substation engineer who recognizes that an IED lacks support for the RREC Logical Node (which represents an auto recloser) as defined in IEC 61850-5 and IEC 61850-7-4. The ICD file provided with the IED does not define a Data Type Template for the RREC Logical Node. Furthermore, the IED does not contain an internal representation of an auto recloser. Using the configuration tool, the ICD file may be modified to add the RREC Logical Node to the Data Type Template section and to the IED instantiation section of the ICD file and then produces a CID file. The configuration tool may further be used to modify the RREC Logical Node instantiation in the IED instantiation section of the CID file in order to add programmatic information indicating how individual data attributes of the RREC Logical Node derive their data from data internal to the IED through definition, selection, calculation or composition.

The configuration tool transmits the CID file to the IED. The IED parses the CID file, thereby recognizing the newly defined RREC Logical Node and its associated programmatic information. Via a manufacturer design pattern, the IED creates an internal object to represent the RREC Logical Node. The manufacturer then provides the associated programmatic information to the internal object, and to other internal subsystems capable of interpreting it.

In yet another embodiment, a GOOSE message may be used to change between IED group settings on IEDs within the network. Group settings may include, among other things, settings of individual items in a group on an IED. For example, the IED may be a protective relay with four groups of settings. One group may be used for IED operation in the summer months. This group may contain calculations for line sag that use different constants than the calculations for line sag in any of the other groups. The IED may be configured using the method above to switch between predetermined group settings upon receipt of a predetermined GOOSE message. In this way, if several similar IEDs are present on a single network, a single GOOSE message received by all of the IEDs could be used to switch between group settings on all of the IEDs. This could be performed using a remote bit.

In yet another embodiment, gating and quality selection settings may be implemented using the GOOSE Message Editing Tool 24 (as illustrated in FIG. 1), Report Editing Tool 26 (as illustrated in FIG. 1) or any other comparable tool. Yet in another embodiment, the configuration tool includes a quality check option for an incoming GOOSE message that maps a plurality of levels of quality checks and validates the incoming GOOSE message. A plurality of states of validity are issued to an incoming GOOSE message and a determination will be issued to continue to receive or to ignore the GOOSE message and/or a portion of the data set associated with the GOOSE message.

This quality check includes a method of gating the important GOOSE message quality information. GOOSE messages according to IEC 61850 include a section of bits indicating the quality of the GOOSE message. It may be desirable for an IED to ignore one or more of these quality indicator bits, as the GOOSE message may still be useful to the IED. Without gating, if any of these bits are set, the IED would ignore the message. With gating, however, the substation engineer may select one or more of the quality indicator bits which, if set, will cause the IED to not use the GOOSE message.

Figure 9:
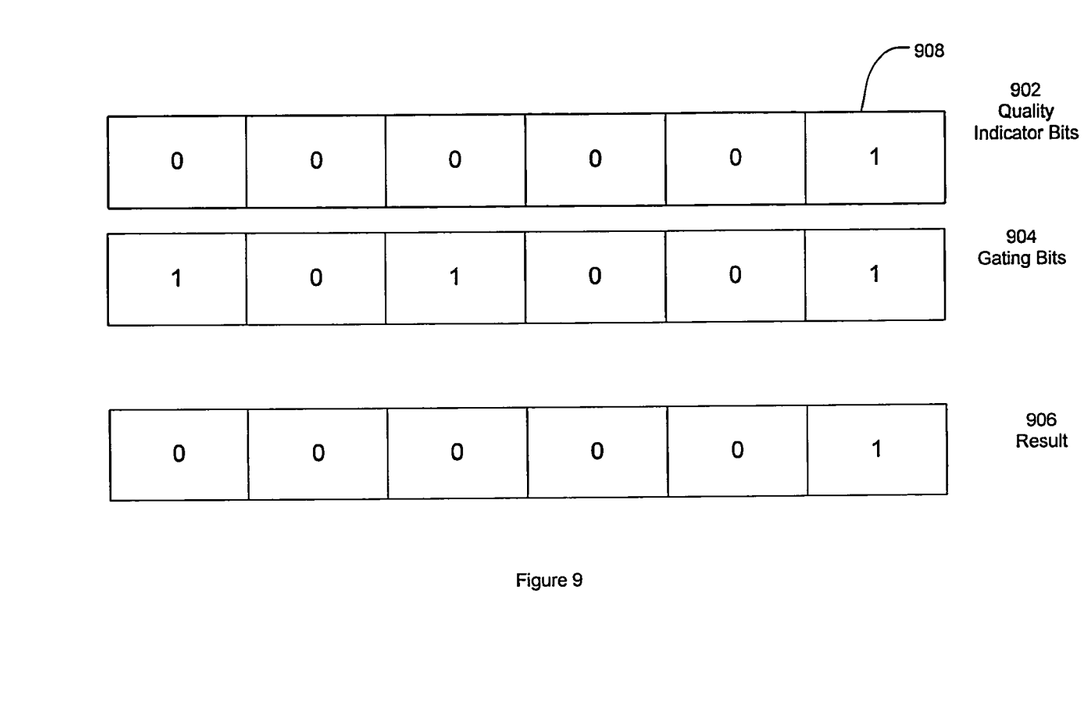
FIG. 9 illustrates an example of a GOOSE message including quality indicator bits and the gating thereof according to an embodiment of the present invention.

For example, as can be seen in FIG. 9, the GOOSE message may contain six quality indicator bits 902, wherein three of these are of interest to the IED. FIG. 9 shows the quality indicator bits 902 of the GOOSE message with the $6^{th}$ bit 908 set, indicating that the quality indicator represented by the $6^{th}$ bit does not meet the quality standard. FIG. 9 also shows the gating bits 904 with the bits in the $1^{st}$, $3^{rd}$, and $6^{th}$ bits set, indicating that the IED is interested in the quality indicators represented by the bits in the $1^{st}$, $3^{rd}$, and $6^{th}$ places. Also shown is the result of the gating 906. The result includes a string of bits which are the result of multiplying the respective bits in the quality indicator string with the respective bits in the gating string. Thus, only bits that are set in both the quality indicator string and the gating string are set in the result. If any bits in the result are set, then the message is not used. If, however, in FIG. 9 the sixth bit were not set, and the fifth bit were set, then the result would indicate all zeros, and although the fifth bit is identified as not meeting the quality standard, the message would be used by the IED.

Figure 10:
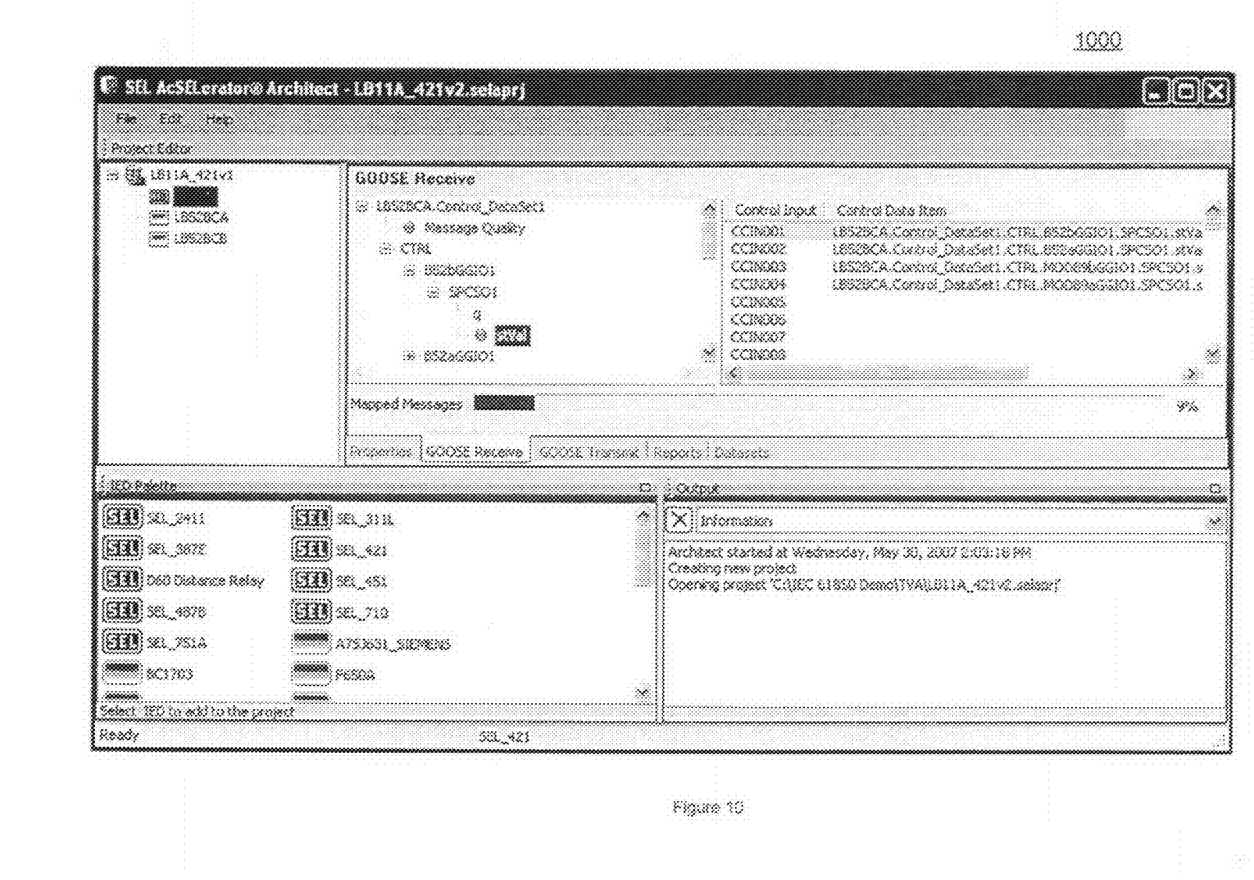

The example below illustrates XML code for a method of gating the important GOOSE message quality information. FIG. 10 is a screenshot of a GUI implementation of the gating method 1000. The 0X1807 (r0$o0x1807 in code form) is the bit map from the check box selection shown in FIG. 8. The bit map result is assigned to a reference variable, r0, which is then referenced in the assignment expression CCIN001$r0. The BVstring 13 is the quality attribute, q, and the Bool is the stVal from the data set.

In yet another embodiment, when creating or receiving a GOOSE message, a masking bit may be used to optimize logic and improve execution speed by indicating the location of one or more important bits in a data stream. For example, if the fifth bit is the one that indicates the valuable data on a certain GOOSE message, a masking bit may be employed as a gate such that the status of the fifth bit is quickly communicated. This method may work in much the same way as the gating function described above and illustrated in FIG. 9. That is, the IED may be configured to apply masking bits (instead of the gating bits) to an incoming GOOSE message (instead of the quality indicator bits) such that any set bits in the result bit stream are bits marked as important (set bits) by the masking bits.

While this invention has been described with reference to certain illustrative aspects, it will be understood that this description shall not be construed in a limiting sense. Rather, various changes and modifications can be made to the illustrative embodiments without departing from the true spirit, central characteristics and scope of the invention, including those combinations of features that are individually disclosed or claimed herein. Furthermore, it will be appreciated that any such changes and modifications will be recognized by those skilled in the art as an equivalent to one or more elements of the following claims, and shall be covered by such claims to the fullest extent permitted by law.

The invention claimed is:

1. A device adapted for communication with a first intelligent electronic device, wherein said first intelligent electronic device is adapted to communicate with other intelligent electronic devices through a plurality of different IEC-61850 Generic Object-Oriented Substation Event (GOOSE) communications messages, wherein the intelligent electronic devices are each adapted to describe an outgoing GOOSE message transmitted therefrom, wherein the first intelligent

```
<esel:GooseSubscription iedName="LB52BCA" IdInst="CTRL"
ebName="Control_DataSet1" datSet="DataSet1" confRev="2" mAddr="01-0C-CD-01-
00-1C" appId="LB52BCA" goCbRef="LB52BCACTRL/LLN0$GO$Control_DataSet1"
datSetRef="LB52BCACTRL/LLN0$DataSet1" pubRxStatus="CCIN041">
    <esel:GooseRxEntry tdlString="(r0$o0x1807)BVstring13" />
    <esel:GooseRxEntry tdlString="(CCIN001$r0)Bool" />
    <esel:GooseRxEntry tdlString="(r1$o0x1807)BVstring13" />
    <esel:GooseRxEntry tdlString="(CCIN002$r1)Bool" />
    <esel:GooseRxEntry tdlString="(r2$o0x1807)BVstring13" />
    <esel:GooseRxEntry tdlString="(CCIN003$r2)Bool" />
    <esel:GooseRxEntry tdlString="(r3$o0x1807)BVstring13" />
    <esel:GooseRxEntry tdlString="(CCIN004$r3)Bool" />
    <esel:GooseRxEntry tdlString="BVstring13" />
    <esel:GooseRxEntry tdlString="Bool" />
    <esel:GooseRxEntry tdlString="BVstring13" />
    <esel:GooseRxEntry tdlString="Bool" />
    <esel:GooseRxEntry tdlString="BVstring13" />
    <esel:GooseRxEntry tdlString="Bool" />
    <esel:GooseRxEntry tdlString="BVstring13" />
    <esel:GooseRxEntry tdlString="Bool" />
    <esel:GooseRxEntry tdlString="BVstring13" />
    <esel:GooseRxEntry tdlString="Bool" />
    <esel:GooseRxEntry tdlString="BVstring13" />
    <esel:GooseRxEntry tdlString="Bool" />
    <esel:GooseRxEntry tdlString="BVstring13" />
    <esel:GooseRxEntry tdlString="Bool" />
    <esel:GooseRxEntry tdlString="BVstring13" />
    <esel:GooseRxEntry tdlString="Bool" />
    <esel:GooseRxEntry tdlString="BVstring13" />
    <esel:GooseRxEntry tdlString="Bool" />
    <esel:GooseRxEntry tdlString="BVstring13" />
    <esel:GooseRxEntry tdlString="Bool" />
</esel:GooseSubscription>
``` electronic device and the other intelligent electronic devices have different data structures, said device comprising:
  a processor for generating a Configured IED Description (CID) file including a section of eXtensible Markup Language (XML) information in Substation Configuration Language (SCL) within the CID file for indicating which one of the plurality of different GOOSE messages the first intelligent electronic device should receive, wherein the CID file comprises a section for mapping data between the first intelligent electronic device and the other intelligent electronic devices; wherein the CID file comprises a model for associating the data structure of the first intelligent electronic device to the data structure of at least one of the other intelligent electronic devices; and wherein the CID file further comprises a section capable of linking to logic functions of the first intelligent electronic device for performing programmable data binding or dynamic data binding.

2. The device of claim 1, wherein the section of the CID file includes a logical node data from at least one of the other intelligent electronic devices.

3. The device of claim 1, wherein the section of the CID file includes internal data specific to at least one of the other intelligent electronic devices.

4. The device of claim 1, wherein the processor of the device and at least some of the other intelligent electronic devices are manufactured by different manufacturers, and
  wherein the processor of the device is adapted to receive information selected from the group consisting of a manufacturer IED Capability Description (ICD) file, a different manufacturer ICD file, a different manufacturer Configured IED Description (CID) file, and a different manufacturer Substation Configuration Description (SCD) file, and
  wherein the processor generates a CID file including a section which indicates which one of the plurality of different GOOSE messages it should receive based on such received information.

5. The device of claim 1, wherein the device is an intelligent electronic device.

6. The device of claim 1 further comprising a memory location coupled to the processor, wherein the memory location stores a repository of IED standard files for generation of a CID file by the processor.

7. The device of claim 6, wherein the IED standard files are selected from the group consisting of ICD, CID, SSD and SCD files.

8. A device adapted for communication with a first intelligent electronic device, wherein said first intelligent electronic device is adapted to communicate with a plurality of other intelligent electronic devices, wherein at least some of the intelligent electronic devices are adapted to communicate with one of the other intelligent electronic devices through a plurality of different IEC-61850 Generic Object-Oriented Substation Event (GOOSE) communications messages, wherein the intelligent electronic devices are each adapted to describe an outgoing GOOSE message transmitted therefrom, wherein the first intelligent electronic device and the other intelligent electronic devices have different data structures, said first intelligent electronic device comprising:
  a processor for editing a Configured IED Description (CID) file by adding a section of eXtensible Markup Language (XML) information to Substation Configuration Language (SCL) within the CID file for indicating which one of the plurality of different GOOSE messages the first intelligent electronic device should receive, wherein the CID file comprises a section for mapping data between the first intelligent electronic device and the other intelligent electronic devices; wherein the CID file comprises a model for associating the data structure of the first intelligent electronic device to the data structure of at least one of the other intelligent electronic devices; and wherein the CID file further comprises a section capable of linking to logic functions of the first intelligent electronic device for performing programmable data binding or dynamic data binding.

9. The device of claim 8, wherein the processor edits the CID file based on an IED Capability Description (ICD) file.

10. The device of claim 8, wherein the first intelligent electronic device and at least some of the other intelligent electronic devices are manufactured by different manufacturers, and wherein the processor of the first intelligent electronic device is adapted to receive information selected from the group consisting of a model number for one of the other intelligent electronic devices, a version number for one of the other intelligent electronic devices, and a part number for one of the other intelligent electronic devices, and wherein the processor edits the CID file based on such received information.

11. The device of claim 8, wherein the first intelligent electronic device and at least some of the other intelligent electronic devices are manufactured by different manufacturers, and wherein the processor of the first intelligent electronic device is adapted to receive information selected from the group consisting of a manufacturer IED Capability Description (ICD) file, a different manufacturer ICD file, a different manufacturer Configured IED Description (CID) file, and a different manufacturer Substation Configuration Description (SCD) file, and wherein the processor generates a CID file including a section which indicates which one of the plurality of different GOOSE messages the first intelligent electronic device should receive based on such received information.

12. The device of claim 8, wherein the device is an intelligent electronic device.

13. The device of claim 8 further comprising a memory location coupled to the processor, wherein the memory location stores a repository of IED standard files for editing a CID file by the processor.

14. The device of claim 13, wherein the IED standard files are selected from the group consisting of ICD, CID, SSD and SCD files.

15. The device of claim 13, wherein the SCL file is an IED Capability Description (ICD) file.

* * * * *